United States Patent
McCabe et al.

(10) Patent No.: US 10,411,972 B2
(45) Date of Patent: *Sep. 10, 2019

(54) DETERMINING IMPACT OF NETWORK FAILURES

(71) Applicant: Amazon Technologies, Inc., Seattle, WA (US)

(72) Inventors: Karl Andre McCabe, Dublin (IE); Eoin Francis Cavanagh, Dublin (IE); Sonali Roy, Seattle, WA (US); Carlos Vara Callau, Dublin (IE); Tyson James Lamoreaux, Seattle, WA (US); Alan Michael Judge, Dublin (IE); Timothy Richard Kohn, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 98 days.

This patent is subject to a terminal disclaimer.

(21) Appl. No.: 15/669,645

(22) Filed: Aug. 4, 2017

(65) Prior Publication Data
US 2017/0331704 A1 Nov. 16, 2017

Related U.S. Application Data

(63) Continuation of application No. 13/959,566, filed on Aug. 5, 2013, now Pat. No. 9,742,638.

(51) Int. Cl.
*H04L 12/24* (2006.01)
*G06F 11/00* (2006.01)
(Continued)

(52) U.S. Cl.
CPC ........ *H04L 41/5009* (2013.01); *G06F 11/008* (2013.01); *H04L 41/069* (2013.01); (Continued)

(58) Field of Classification Search
CPC ..... H04L 41/0631; H04L 41/12; H04L 45/28; H04L 43/50; H04L 43/0829; H04L 43/087; H04L 41/0654; H04L 43/0823; H04L 43/0835; H04L 49/552; H04L 49/555; H04L 49/557
See application file for complete search history.

(56) References Cited

U.S. PATENT DOCUMENTS

| 7,337,206 B1 * | 2/2008 | Wen ........................ H04L 43/00 370/235 |
| 2008/0049640 A1 * | 2/2008 | Heinz ................. H04L 41/0806 370/252 |

* cited by examiner

*Primary Examiner* — Joe Chacko
(74) *Attorney, Agent, or Firm* — Knobbe, Martens, Olson & Bear, LLP

(57) ABSTRACT

Generally described, systems and methods are provided for detecting the impact of network failures. The system collects performance information from a plurality of nodes and links in a network, aggregates the collected performance information across paths in the network, processes the aggregated performance information for detecting failures on the paths, adjusts the set of performance information by removing the performance information for any nodes considered to be associated with performance information that is statistically different from performance information from other nodes at a given location or extrapolates the collected information to other paths, and determines the impact to customers of the network failures detected using the adjusted set of performance information.

20 Claims, 7 Drawing Sheets

(51) Int. Cl.
*H04L 12/26* (2006.01)
*G06F 11/34* (2006.01)
(52) U.S. Cl.
CPC ........ *H04L 41/0677* (2013.01); *H04L 41/507* (2013.01); *H04L 43/04* (2013.01); *H04L 43/0835* (2013.01); *G06F 11/3452* (2013.01); *H04L 41/064* (2013.01)

DETERMINING IMPACT OF NETWORK FAILURES

BACKGROUND

Computer networks generally comprise various interconnected computing devices that can exchange data. Computing devices in a computer network can be in direct communication with one or more other computing devices. Each direct communication connection between computing devices in a computer network is generally referred to as a network link, or a link. While a computer network is generally made up of a number of links, computing devices in a computer network do not typically include links to every other computing device in the computer network. Rather, data to be exchanged between computing devices can be subdivided into packets and propagated via the computer network to eventually reach an intended recipient, regardless of whether there is a direct link between the sender and recipient.

More specifically, packets of data are typically transmitted from an origin computing device to an identified destination computing device. If a packet of data is received by a computing device that is not the identified destination computing device, the receiving computing device becomes an intermediary in the communication path between the origin computing device and the destination computing device by forwarding the packet to another computing device in the computer network. Accordingly, each packet of data is transmitted through one or a series of intermediate links in the computer network until the packet reaches its destination computing device. The one or more links for delivery of a packet of data between an origin computing device and a destination computing device is generally referred to as a network path, or a path.

At each computing device in a communication network, an independent decision may be made regarding the path to the identified destination computing device for each received data packet. Each computing device can use several factors for making the decision regarding the path to the identified destination. For example, in some networks, portions of the destination address included in the data packet may be used to compare to a lookup table on the computing device. Based on the independent decision, a receiving computing device transmits a received data packet on the next intermediate link in the path.

Indications of total traffic on any one link in the network may be obtained by measuring packets transmitted or received on the two computing devices connected by that link. As networks become increasingly complex, network operators may desire to obtain information regarding the performance of paths in the network, rather than indications of total traffic on individual links. The performance of paths in the network may include a view of the interconnection between all the computing devices in the network. Performance of the paths may also include indications of network availability or failures, which may include an indication of dropped or lost packets, an indication of service degradation, or even of a network halt due to excessive traffic.

In some cases, the computer network may be part of a network operated as a data center. Operators of data centers generally wish to ensure the highest availability possible for their network at the lowest cost possible. Problems relating to network failures affect the operators' overall costs. The operators typically wish to be able to accurately estimate the impact of the network failures. For example, in some situations, several different components in the network may be affected by the same cause of failure. In other situations, several causes of failures may affect the same network component. In either of these circumstances, a network failure should be detected. As another example, some failures may demonstrate high packet loss but may be confined to a small number of devices, while other failures may demonstrate low packet loss, but be confined to a large number of devices. The data center operators wish to identify the impact of all types of failures.

BRIEF DESCRIPTION OF THE DRAWINGS

The foregoing aspects and many of the attendant advantages will become more readily appreciated as the same become better understood by reference to the following detailed description, when taken in conjunction with the accompanying drawings, wherein.

DETAILED DESCRIPTION

Figure 1A:
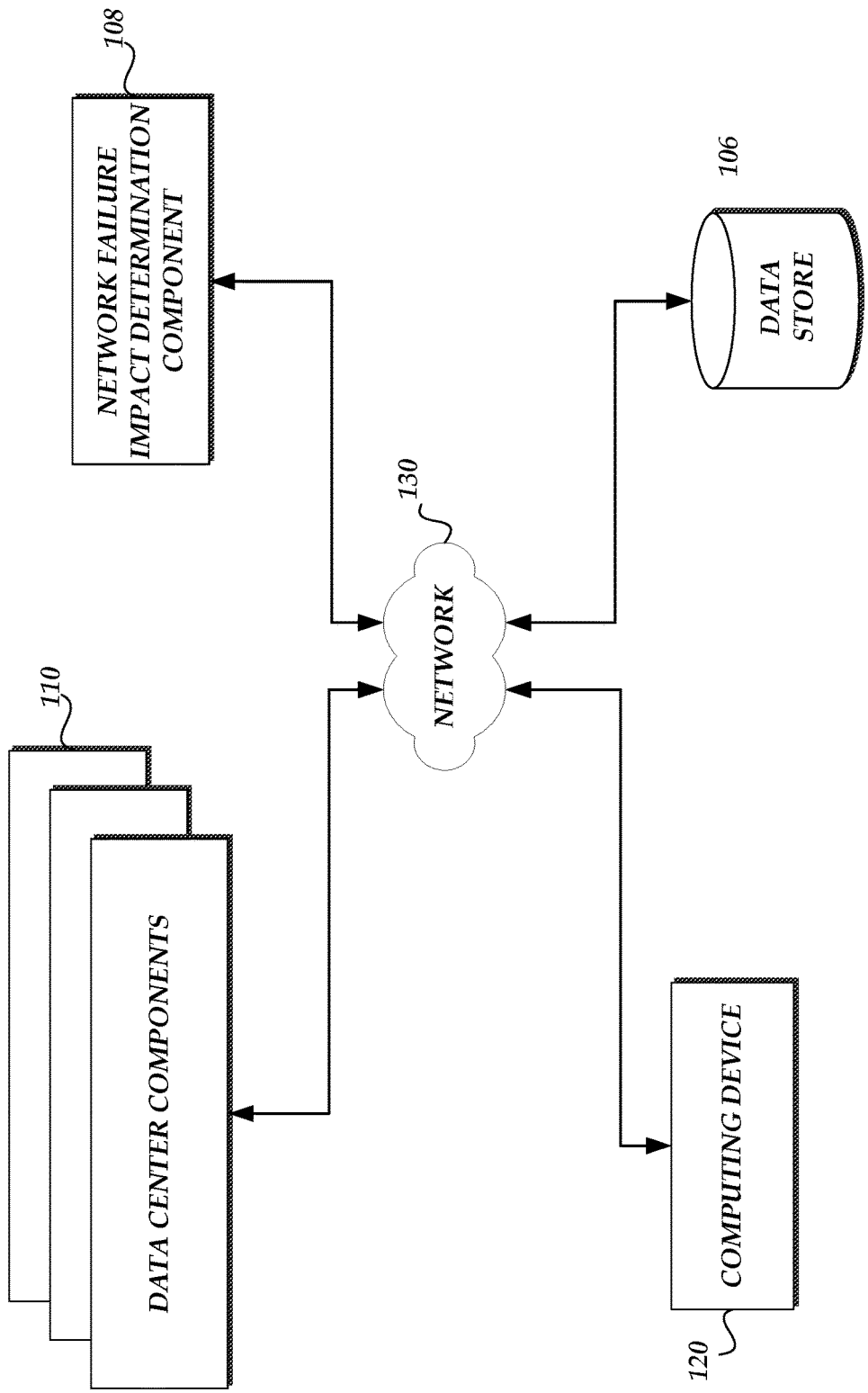
FIG. 1A is a block diagram depicting an illustrative embodiment of a computing environment implementing a network failure impact determination system.

Generally described, aspects of the present disclosure relate to the management of information related to the impact of network failures. Aspects of the present disclosure enable the determination of impact of failures in networks by collecting performance information across paths in the network, wherein the paths include one or more nodes and links between nodes in the network. Once there has been sufficient performance information collected, the system analyzes the performance observed on paths associated with at least one common node. The analysis of the performance observed may include an assessment of the absolute and relative quantity of paths on the network with a performance level above or below a predetermined threshold. The assessment of the absolute and relative quantities may be used to determine a scale of customer impact of any observed failure in the network. For example, determining the impact may include determining the quantity of paths associated with specific customers' sub-networks. Based on the analysis of the performance, the system may also determine whether some nodes are associated with performance information that is statistically different from performance information from other nodes. Such nodes may be labeled as "outliers." For nodes labeled as outliers, the performance information associated with paths crossing through such nodes may be adjusted to exclude the performance of links having comprising at least one outlier node. Then, the performance information associated with outlier nodes is not considered in a subsequent analysis used to determine the impact of any network failures.

Illustratively, systems and components which are common to any set of data center components may be identified and analyzed to determine whether a failure may affect multiple otherwise independent data center components. Devices (also referred to herein as servers, or nodes) in the network may be physically connected to one another. In addition, devices may also be organized into logical hierarchies and connected with physical cabling, wireless signaling or otherwise purely programmatic abstractions (e.g., API calls). These "logical topologies" apply to such things as network layout of hosts within a network switching fabric, power connections made through data center, room and rack level power distribution components or execution dependencies between software components. Components may fail in the physical domain and interrupt correct functioning of devices that are not necessarily in close physical proximity because of the "logical" connections; for example, a failed network router may cause service interruptions to servers even in entirely different geographic regions. Such logical hierarchies of devices, servers or nodes may be referred to as "racks" of devices, servers or nodes herein.

Although various aspects of the disclosure will be described with regard to illustrative examples and embodiments, one skilled in the art will appreciate that the disclosed embodiments and examples should not be construed as limiting. Various aspects of the disclosure will now be described with regard to certain examples and embodiments, which are intended to illustrate but not limit the disclosure.

An example network computing environment in which the features of the network failure impact determination system can be implemented will be described. FIG. 1A illustrates a network computing environment including a network failure impact determination component 108, multiple data center components 110, a data store 106 and a client computing device 120. The various components may communicate via a network 130. In some embodiments, the client computing device 120 may include computer hardware and software components. Those skilled in the art will recognize that the client computing device 120 may be any of a number of computing devices that are capable of communicating over a network including, but not limited to, a data center server, workstation, laptop, personal computer, tablet computer, electronic book reader, personal digital assistant (PDA), hybrid PDA/mobile phone, mobile phone and the like. The network failure impact determination component 108 may create graphical representations of the interconnection between the data center components, and the graphical representation may be made available to be displayed on a client computing device 120. The network failure impact determination component 108 may also store information collected and aggregated from the data center components into the data store 106 for later retrieval and use. In some embodiments, the network computing environment may include additional or fewer components than those illustrated in FIG. 1A. For example, the number of data center components 110 may vary substantially, etc. The computing environment may also be collaborating with other network management systems in various data centers.

Illustratively, the network failure impact determination component 108 can receive data from a number of data center components 110, detect the existence of network failures, determine the impact of such network failures, and respond to queries from the client computing device 120. For example, the network failure impact determination component 108 may receive data regarding the data center components 110 and operational characteristics thereof directly from the data center components 110, from a data store 106, from data entry or manual scanning of barcodes associated with the various data center components, or from some other sources. In some embodiments, the network failure impact determination component 108 can generate an alert upon detection of a network failure and/or determination of impact of such network failure.

The network failure impact determination component 108 or the client computing device 120 may be computing devices, such as server computers or desktop computers, configured with various hardware and software modules to implement the processes described herein. In addition, the network failure impact determination component 108 and/or the client device 120 may be physically located within a data center, and may therefore also be a data center component 110. In some embodiments, the network failure impact determination component 108 or client device 120 may be remote from the data center which includes the data center components 110. In some embodiments, the network failure impact determination component 108 may be integrated with the client device 120 or physically co-located on the same computing device.

Figure 1B:
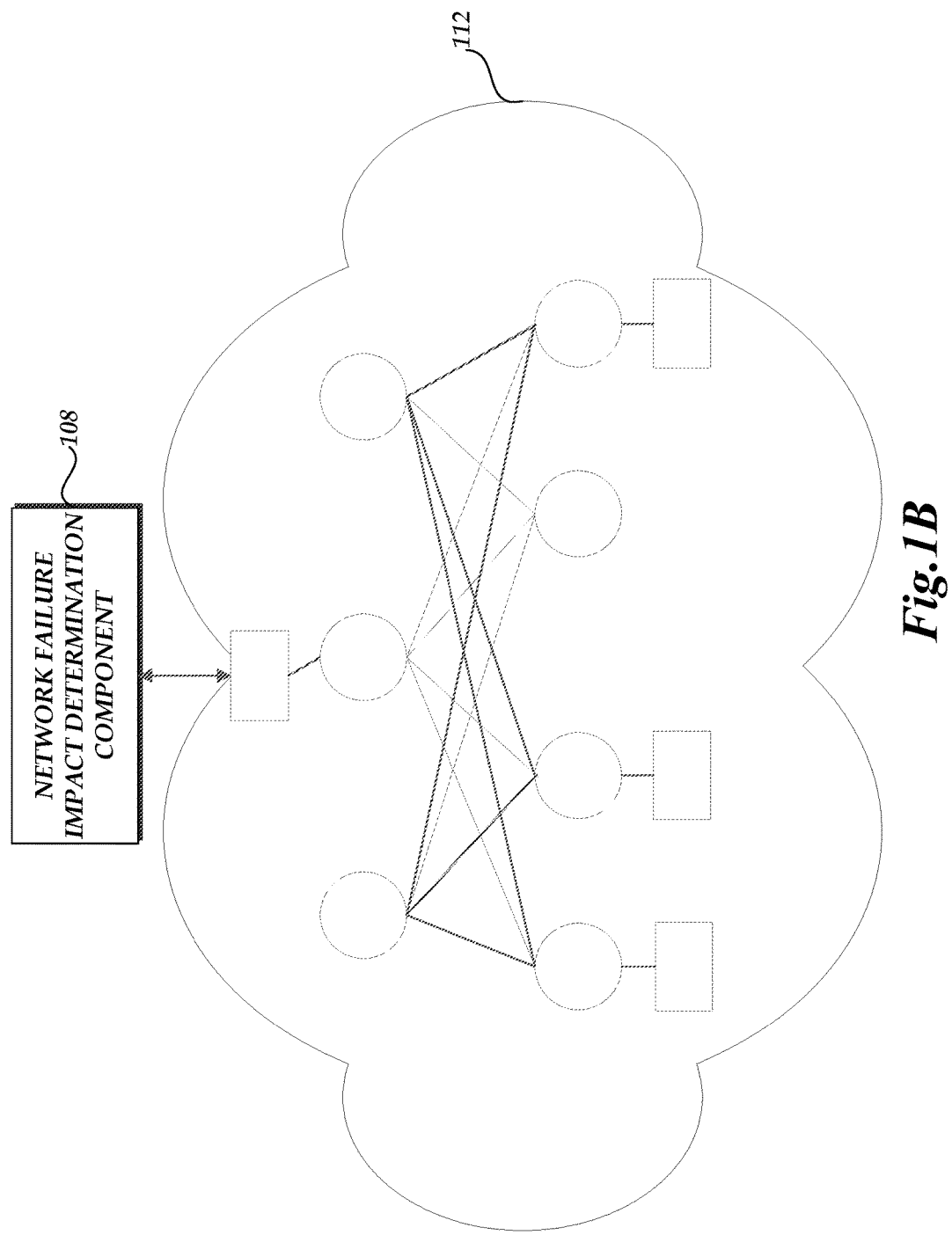
FIG. 1B is a block diagram depicting an illustrative interconnection between a network failure impact determination component and a network of interconnected nodes.
Figure 2A:
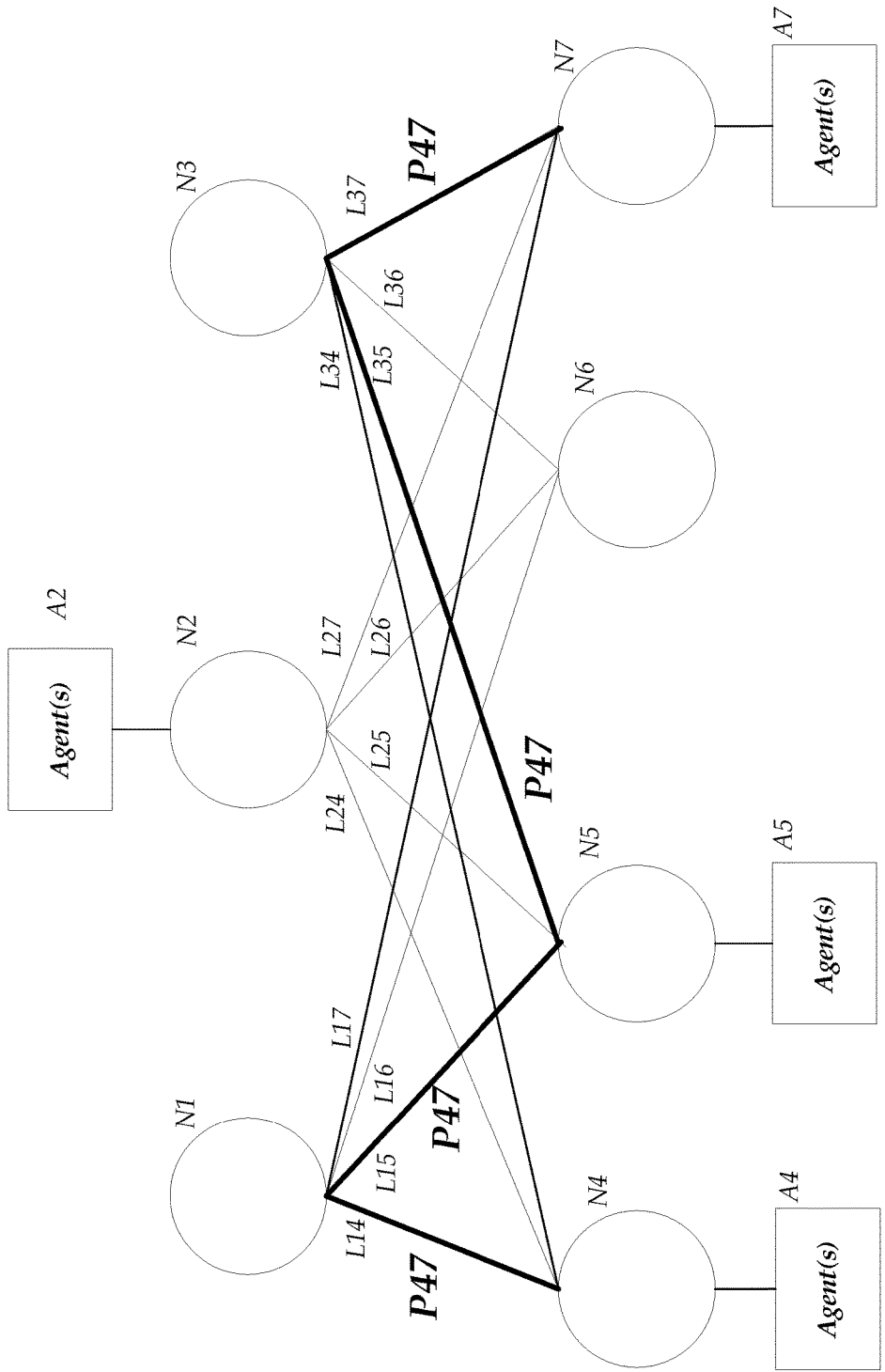
FIGS. 2A and 2B are schematic diagrams of an illustrative network topology defining various nodes, links and paths.
Figure 2B:
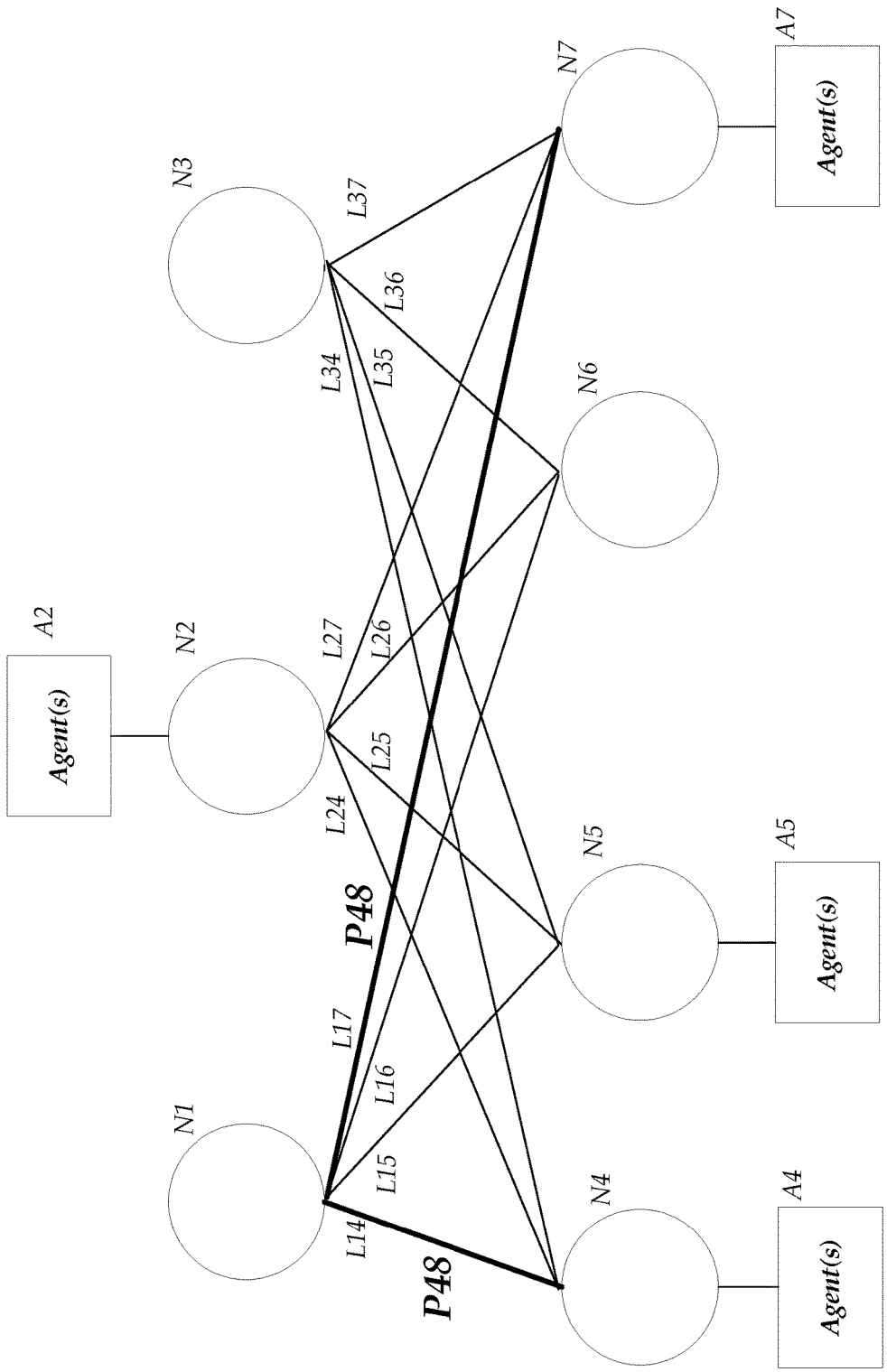

FIG. 1B is a block diagram depicting an illustrative interconnection between the network failure impact determination component 108 and a network 112 of interconnected data center components 110 within a data center 100. Illustratively, the network failure impact determination component 108 may collect information from the various data center components 110 in the network 112 and aggregate the information collected. In various embodiments, the information collected may include paths taken between nodes in the network, as well as performance indices along the various paths. FIGS. 2A and 2B illustrate examples of nodes, links and paths. The performance indices may include jitter, loss, latency of packets (including one-way and round-trip latency), dropped packets, bandwidth of links and the like. Using the information collected and aggregated, the network failure impact determination component 108 may process the information to detect network failures and to determine the customer impact of detected failures in the network.

FIGS. 2A and 2B are schematic diagrams of nodes, links and paths in an illustrative network, such as for example network 112 illustrated in FIG. 1B. FIG. 2A illustrates nodes N1-N7, links L14-L17, L24-L27 and L34-L37, and path P47. As indicated, a direct connection between a pair of nodes consists of a link. Illustratively, nodes N1 and N4 are interconnected by link L14. Similarly, nodes N1 and N5 are interconnected by link L15. Illustratively, a connection between the nodes, such as link L14 between N1 and N4, may involve additional computing or networking components. However, such a link will be considered direct for the purposes of this disclosure.

In accordance with FIG. 2A, communications of data involves sending individual packets of data from an origin node (such as for example one of nodes N1-N7) to a destination node (such as for example another one of nodes N1-N7). A packet sent from an origin node to a destination node which is more than one link away from the origin node follows a path consisting of several links. For illustrative purposes, a packet from node N4 to node N7 may follow a path P47. Path P47 illustrated in FIG. 2A includes links L14, L15, L35 and L37. In other embodiments, a path may include a single link.

Illustratively, the origin node does not specify the path in which a packet may or must travel. For illustrative purposes, for the packet travelling from node N4 to N7, N4 does not specify that the packet may or must travel through N1, N5 and N3. Rather, if a receiving node, such as node N1, which is an intermediary node, and is not the destination node N7, obtains a packet from N4, it transmits the packet to another node, such as N5 via a selected link, such as link L15.

Accordingly, the results of each intermediary node (such as for example nodes N1, N5 and N3) forwarding a packet defines the path which the packet takes from N4 to N7. As such, the same intermediary node may forward successive packets along different links, which would result in the successive packets being forwarded to the destination node along different paths based on the selection of the link the intermediary node. With reference to FIG. 2B, another packet transmitted between node N4 and N7 may follow a path P48 including links L14 and L17. In contrast to path P47, the path P48 includes a path from node N4 to N1 and then to N7, with no other intermediary nodes.

One skilled in the relevant art will appreciate that networks monitored by the network failure impact determination component 108 may include several more nodes than the illustrative network shown in FIGS. 2A and 2B. Accordingly, the number of potential paths and links between paths can vary greatly accordingly to the configuration of the nodes, generally referred to as the network topology.

FIGS. 2A and 2B also illustrate agents A2, A4, A5 and A7 associated with nodes N2, N4, N5 and N7. Each of the nodes in the network may be associated with an agent. The agent may be on the same device as the node, or on a separate device. In various aspects, the network failure impact determination component 108 selects certain nodes, such as nodes N2, N4, N5 and N7, in the network 112 to act as transmitters of messages to other nodes in the network 112 in order to test the reachability of those other nodes. The messages sent to the other nodes may consist of content-less messages. In some embodiments, the transmitters may use User Datagram Protocol (UDP) packets to send the content-less messages. In other embodiments, Transmission Control Protocol (TCP), Internet Control Message Protocol (ICMP), Infiniband (IB) or other types of packets may be used. The agents A2, A4, A5 and A7 associated with each of the nodes N2, N4, N5 and N7 may be used to transmit the content-less messages, to respond to the messages sent from transmitters, and also to collect responses received. The network failure impact determination component 108 may then measure the round-trip time for messages sent from the transmitting nodes based on the response received from the agents. The network failure impact determination component 108 may also measure the loss of packets between transmitting nodes and receiving nodes, by measuring packet transfer rates (PTR). Illustratively, the PTR may be represented by the percentage of packets transmitted from a source node which are successfully received by the destination node. Similarly, the packet loss rate (PLR) may be the percentage of packets transmitted from a source node which are not successfully received by the destination node.

Figure 3:
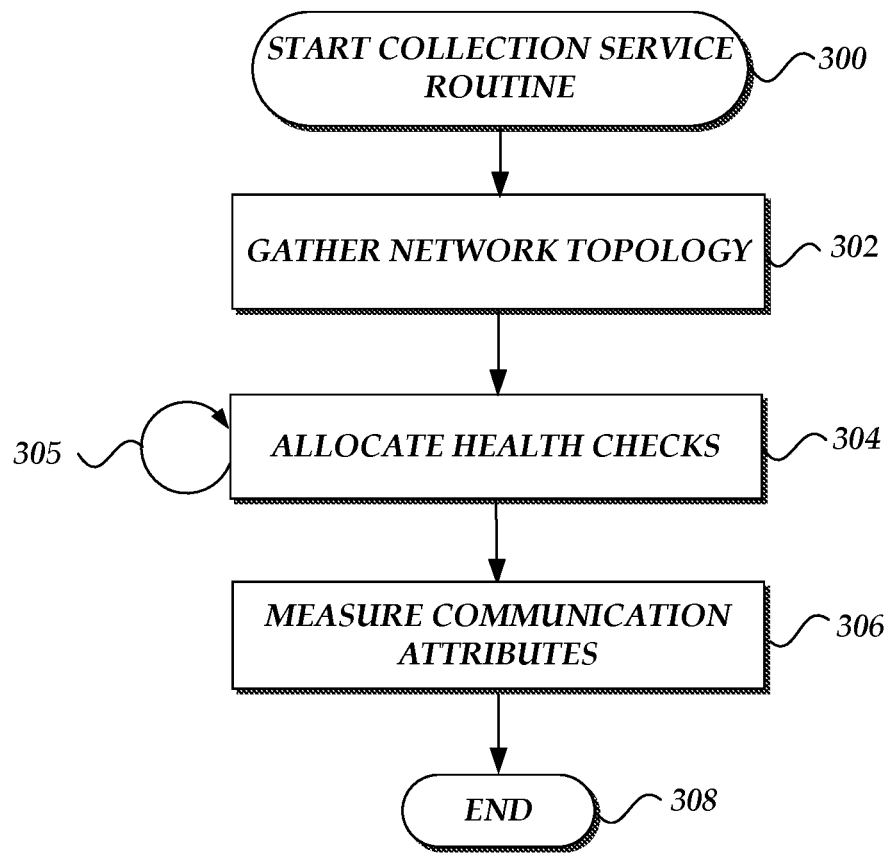
FIG. 3 is a flow diagram depicting an illustrative routine for collecting information from nodes in a network.

FIG. 3 is a flow diagram depicting an illustrative routine 300 for collecting information from nodes in a network. One skilled in the relevant art will appreciate that actions/steps outlined for routine 300 may be implemented by one or many computing devices/components that are associated with the network failure impact determination component 108 (FIG. 1). Accordingly, the routine has been logically associated as being generally performed by the network failure impact determination component 108, and thus the following illustrative embodiments would not be considered as limiting.

At block 302, the topology of the network is gathered, in order to be used for network failure impact determination, as described further in connection with the routine 400 illustrated in FIG. 4 below. Illustratively, the agents (such as A2, A4, A5 and A7 in FIGS. 2A and 2B) measure the route path and communication attributes through the network 112. Communication attributes may include various measurements such as, for example, transit times of packets sent through the network, packet transfer rate (PTR), and packet drop rate (PDR). The information collected from multiple agents may be aggregated at the rack level of the hierarchy.

In order to determine whether there are any remaining paths for which data needs to be gathered, a rough knowledge of the network topology may be used. The rough knowledge of the network topology may be derived from querying router devices in the network to gather topology information such as information provided by various routing protocols, such as for example, Open Shortest Path First (OSPF) and Border Gateway Protocol (BGP). The rough knowledge of the topology may also be based on diagrams provided by network technicians. The diagrams provided may also be associated with various confidence levels. The rough knowledge of the topology may also be based on knowledge of the workflow of the build process for the network. For example, it may be known that the network was initially designed with a 100 nodes, and there was a planned expansion of a doubling of nodes in a given timeframe within a given geographic area. The topology may also be inferred from a combination of external sources, such as configuration files, technicians' information, automated switch building, subnet analysis, SNMP query information regarding run-time configuration states of devices, or other monitoring services. The topology of the network is gathered and stored. The topology may also be periodically validated to ensure it is up to date, and updated as necessary. Any topology changes observed may be used to trigger reallocation of health checks at block 304 described below. The topology gathered may be made available for display.

At block 304, health checks are allocated across the paths in the network. In one embodiment, in order to not overload links in the network with health check information, the network failure impact determination component 108 determines a minimum number of health checks across the network that may be necessary to adequately cover potential paths in the network. The minimum number of health checks may be related to the size of the network. The minimum number of health checks may also be related to the network operator objectives, including the balance between overloading the network by running health checks and gathering sufficient data to triangulate issues with a given level of statistical power. The frequency of health checks may be set and adjusted in various ways. The frequency may be static, it may be manually adjusted, or it may also be dynamically adjusted based on business logic. The frequency of health checks may also be adjusted (as indicated by the loop 305 based on topology changes observed in block 302 or based on frequency of such topology changes. The health check allocation may also be adjusted based on validation of the allocation strategy at block 404 described below with reference to FIG. 4. As described above, a path includes source and destination nodes, and a series of intermediate nodes and links between the nodes. Packets arriving at a node may await transmission to the next node according to the packet's protocol as handled by the node. If the memory of the node is full when a packet arrives, the packet may be discarded. Otherwise, the packet is held until it reaches the front of the queue and is then forwarded to the next node on the way to its destination. This waiting mechanism may be responsible for observed packet losses and for packet latencies. Other reasons may also contribute to packet losses or latencies.

A ping utility may be used to check if a remote device is operating and connected to another node in a network. The source device may send an Internet Control Message Protocol (ICMP) packet to the remote device's IP address. If the destination device is operating and the network links are healthy, the source device will receive a return an ICMP packet, unless configured to ignore such requests. Thus, the network failure impact determination component 108 can collect data on roundtrip times and delays using the ping utility. Using other packet protocols, including for example TCP, UDP and the like, may have different advantages and may be used in various embodiments, which may be chosen based on the intended use cases of the network. In some embodiments, transmitting a message with UDP or TCP packets instead of ICMP packets provides the added advantage of being able to select the paths taken between two endpoints.

The network failure impact determination component 108 may manipulate paths between the two endpoints by manipulating port numbers. For example, the network failure impact determination component 108 may manipulate paths in accordance with flow preserving next-hop packet forwarding protocols such as Equal Cost Multi-Path (ECMP). With ECMP, and similar flow preserving packet forwarding strategies, at each node in the network, the decision on which path to take to send a packet to the destination computing device is done independently, and is deterministically dependent on the source port number, the destination port number, the source IP address, and the destination IP address. The use of UDP packets by the transmitters of the network failure impact determination component 108 allows the packets to be re-routed as necessary to a path for which data needs to be gathered. The re-routing is enabled by manipulation of port numbers. Each node learns and takes a default flow through the nodes in the network to arrive at a given destination. By manipulating the destination port through the use of UDP packets, the intermediate packet forwarding devices can be forced into taking a different, desired path. Therefore, in the network failure impact determination component 108, each link in the network 112 is covered by a sufficient number of paths in order to identify a failing link from a set of failing paths. The various paths covering a link may be achieved by using one or more of the agents on the nodes.

The strategy for allocating health checks across a network may include iterating through all the links in a network in order to meet a number of predetermined constraints. Examples of such constraints may include, for example, a minimum number of paths per link, or a maximum number of paths per link. In order to achieve a level of desired allocation coverage, the network failure impact determination component 108 may add synthetic network traffic by sending probes from select agents in the network. It may be desirable to throttle the frequency of health checks to manage the load generated on network links. However, a minimum number of health checks are necessary for adequate coverage and monitoring of the network. In order to accurately measure packets dropped or lost on links to nodes, each node is tested for reachability at an ideal frequency designed to keep the amount of data generated by the transmission of the messages to a workable level while accurately measuring packet loss. In some embodiments, a health check may be initiated every 100 milliseconds, or every 500 milliseconds, or every 5 seconds, or every 5 minutes, or any other suitable period of time according to business and/or other requirements of the network supported service.

Using the network topology previously gathered, each link in the network is iterated through in order to ensure that at least one path traverses the link. If a path is successfully allocated to a given link, a counter for all links on a path may be incremented by a certain value. If however if a path is not allocated to a link yet, then the health check allocation may be adjusted to achieve a desired path until all links achieve a target number of paths per link.

Once the health checks are allocated (and adjusted), then, at block 306, the communication attributes across the network are measured. The communication attributes may be measured on one-way or on round-trip paths. Since the different paths of the network are discovered during topology gathering at block 302, the route followed by a data packet is known based on the combination of the source IP and port, and destination IP and port used in the packet. The time taken to send and receive the packet is recorded by the network failure impact determination component 108. Once the communication attributes are measured on the various paths in the network 112, the routine ends at block 308.

Though the process described above may describe actions or events in a linear manner, the description is not meant to imply that linear execution of the process is required. One skilled in the art will appreciate that components of the process described above may be carried out in different orders than described above. As such, the description of the process above is intended to be descriptive of one example only.

Figure 4:
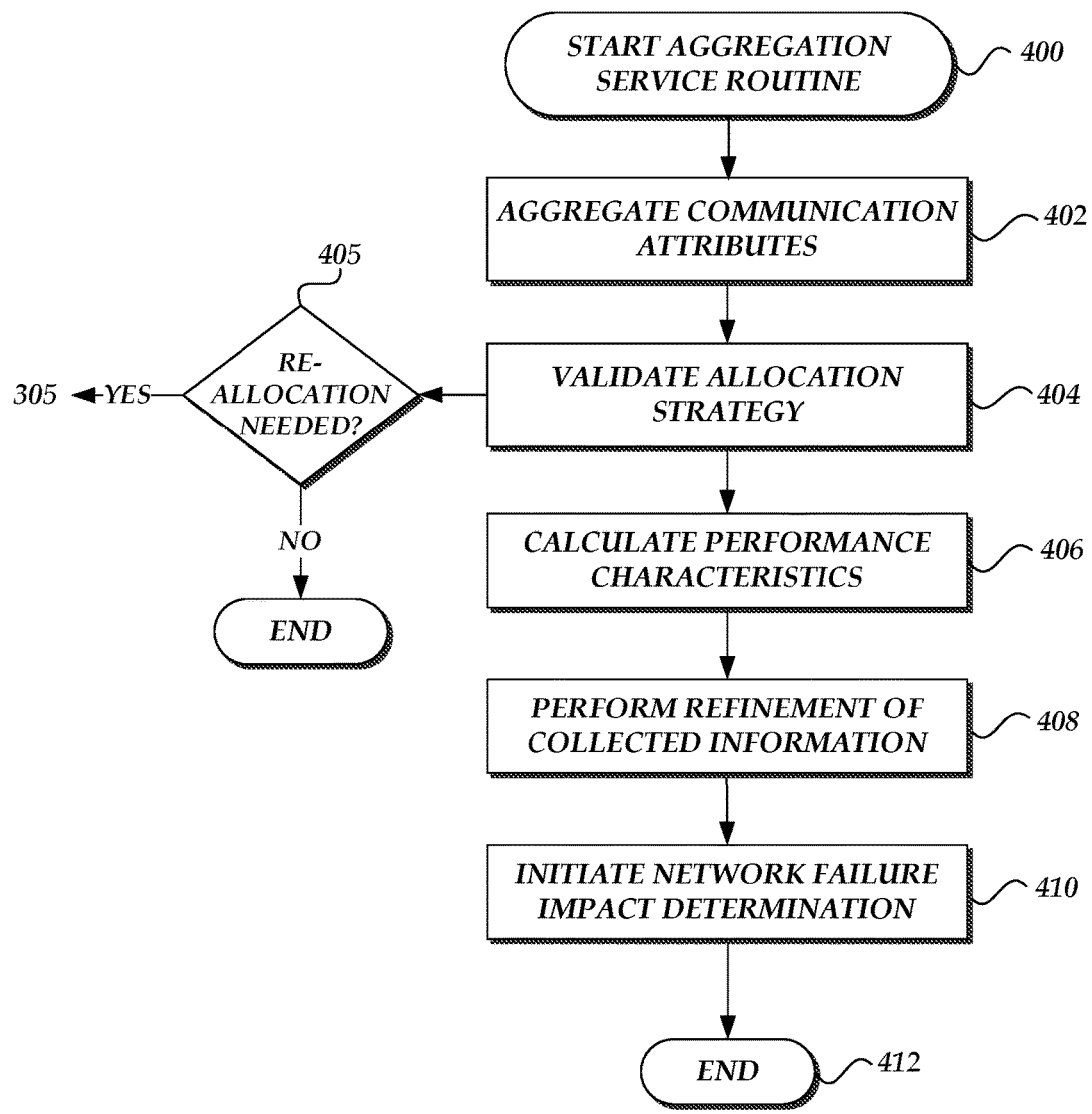
FIG. 4 is a flow diagram depicting an illustrative routine for aggregating information collected from nodes in a network.

FIG. 4 is a flow diagram depicting an illustrative routine 400 for aggregating information collected from nodes in the network 112, such as the collection service routine 300 illustrated in FIG. 3. One skilled in the relevant art will appreciate that actions/steps outlined for routine 400 may be implemented by one or many computing devices/components that are associated with the network failure impact determination component 108. Accordingly, the routine has been logically associated as being generally performed by the network failure impact determination component 108, and thus the following illustrative embodiments would not be considered as limiting.

At block 402, the communication attributes collected by each of the selected nodes are aggregated. Aggregation of the communication attributes enables reliable detection of failing paths. Data collected across several paths crossing the same node through different links or through packets sent from different transmitter nodes are aggregated. In some embodiments, the aggregation uses information from the gathered network topology. In some embodiments, the aggregation may be done at a rack level. For example, the performance information for all paths associated with a logical grouping of nodes may be aggregated. In some embodiments, the logical grouping of the nodes may be based the association of the nodes with individual customers of the data center.

At block 404 the communication attributes collected are used to determine whether the allocation strategy adopted is appropriate. The allocation strategy aims to provide adequate coverage of all the paths in the network. The communication attributes collected may indicate a need to adjust the allocation strategy in order to collect more path information. The health check frequency may thus be increased in some scenarios. In some scenarios, new paths may be allocated to one more different agents on the networks. At block 405, if it is determined that the health checks need to be reallocated, then the loop 305 of the routine 300 may be repeated.

At block 406, using the communication attributes aggregated, the network failure impact determination component 108 calculates performance characteristics for the paths, using the network topology gathered at block 302 of the collection service routine 300. Performance characteristics may include indications of packet transfer rate, packet loss, latency, throughput, jitter and the like. The aggregation service may store the information collected and aggregated in a data store such as data store 106 illustrated in FIG. 1. The aggregation service may also create visualizations to make available for display one the client computing device 120 of FIG. 1. The visualizations may display the performance characteristics in tabular format. The performance characteristics may also be displayed on the network topology representation graph. In some aspects, the performance and health characteristics may be overlaid on the network topology by the use of different colors, textures or other User Interface (UI) visualization elements for different link health or performance indications.

Using the network topology gathered at block 302 of the collection service routine 300, the aggregation service may iterate through all the links in the network topology in order to compute a percentage of links and nodes which indicate a failure. The links and nodes may be sorted by failure percentage. The performance information collected for the links and nodes may also be used to compute path performance and thereby determine, for example, customer impact of any failures observed.

At block 408, the aggregation service performs refinement of the collected information. Having calculated the performance characteristics over the paths on the network, the aggregation service may, using knowledge regarding the network topology, refine the collected information to reduce the amount of information used to perform network failure impact determination. For example, a criterion for refinement may be to only consider paths on the network through which a predetermined percentage of the packets are transmitted. Another criterion for refinement may be to only consider paths which exhibit packet loss exceeding a predetermined threshold. An illustrative example of refinement may be to only consider a node or link if a predetermined percentage of paths through the node or link drop more than a predetermined percentage of packets. Other criteria may also be used for refining the collected information, and one or more criteria may be used in conjunction with others. In some embodiments, the refinement of collected information may not be performed, and all of the collected information may be used to perform network failure impact determination.

Figure 5:
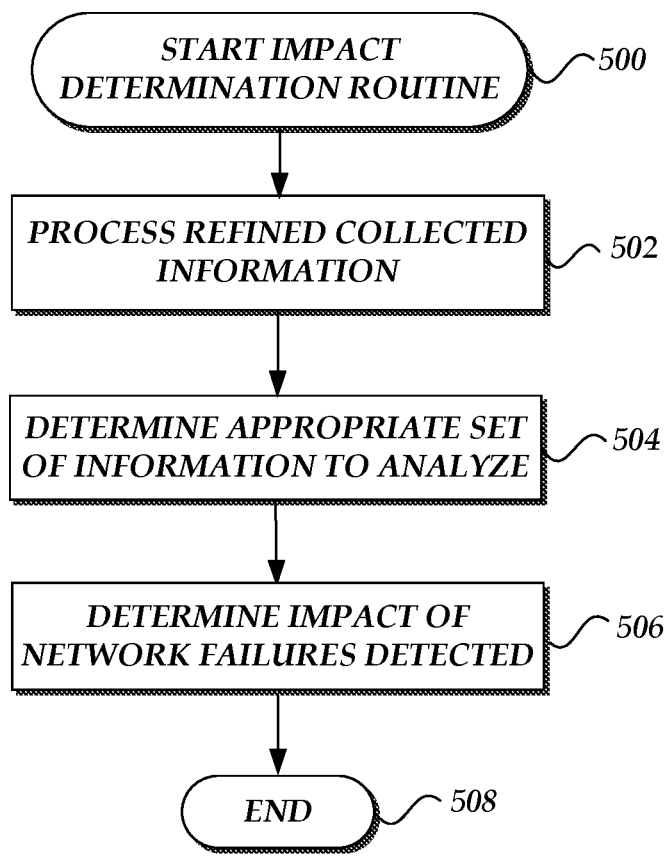
FIG. 5 is a flow diagram depicting an illustrative routine for determining impact of network failures.

At block 410 the aggregation service initiates a network failure impact determination subroutine, an example of which is described with respect to FIG. 5 below. Once the network failure impact determination subroutine is initiated, the routine 400 ends at block 412.

Though the process described above may describe actions or events in a linear manner, the description is not meant to imply that linear execution of the process is required. One skilled in the art will appreciate that components of the process described above may be carried out in different orders than described above. As such, the description of the process above is intended to be descriptive of one example only.

In some embodiments, network failure detection may be performed by constructing a set of equations given a performance indication across a path given estimates on performance indication for each link and node in the path. This allows a numerical optimization method to solve for the performance indication for each link and node in the path given the data on the performance indication across paths. For example, one indication of performance may be packet transfer rate (PTR). Another indication of performance may be loss. The loss may be represented by a packet loss rate (PLR). In some embodiments, the PLR may be represented by the percentage of packets transmitted from one node and not successfully received by another node. In some embodiments, the PLR may be represented as 1-PTR.

Given the performance characteristics collected from various paths, a set of equations given an indication of performance across a path may be developed in order to solve for the performance indications for each link and node in the path. The health of each node and each link can be represented as a system of equations dependent on the network topology. The health of each node and link in the network can be determined by solving the system of equations in the context of the pathwise performance indication. In some embodiments, the performance indication can be data related to packet transfer rates. Therefore, in order to perform network failure detection, data for enough different paths needs to be collected.

Generally described, the network failure impact determination component 108 processes the aggregated data to determine the impact of the detected failures. In one embodiment, the scale of customer impact may be determined. In another embodiment, the locations of nodes impacted by network failures may be determined. FIG. 5 is a flow diagram depicting an illustrative routine 500 for determining the impact of network failures detected. One skilled in the relevant art will appreciate that actions/steps outlined for routine 500 may be implemented by one or many computing devices/components that are associated with the network failure impact determination component 108. Accordingly, the routine has been logically associated as being generally performed by the network failure impact determination component 108, and thus the following illustrative embodiments would not be considered as limiting.

At block 502, the collected information which has been refined by the process illustrated in FIG. 4 is processed. As described above, the amount of information used to perform network failure impact determination may be all of, or a subset of the information collected from the network. In some embodiments, processing the collected information may include determining a set of paths associated with given nodes in the network, and analyzing the set of paths to determine any discrepancies for nodes located in the same rack of the data center, for example. In some embodiments, if any nodes are found to have discrepancies, the collected information for such nodes may be excluded from the aggregated information, and the determination of the network failure impact may be performed without such excluded information.

Each node in the network may be associated with several paths of links passing through the node. The statistics collected for the several paths associated with the node may be further analyzed to determine a number of problematic paths passing through the node, and also a number of non-problematic paths passing through the same node. In various embodiments, a problematic path may include a path exhibiting percentage performance characteristics exceeding or not meeting a predetermined threshold. Then, the numbers of problematic and non-problematic paths associated with other nodes in the same rack of the data center may also be determined. By comparing the performance of paths of different nodes located on the same rack of the data center, it is possible to make a determination of whether the node itself is problematic, or the paths associated with the nodes are indeed problematic.

For example, it may be determined that a total of 15 paths passing through a node, say node 1, are problematic, and 2 paths crossing through the node 1 are non-problematic. For another node in the same rack, say node 2, it may be determined that there are a total of 8 paths which are problematic and 7 paths which are non-problematic. For yet another node in the same rack, say node 3, there may be 3 paths which are problematic and 2 paths which are non-problematic. Given that the nodes logically associated with one another are expected to exhibit similar path performances, the network failure impact determination component 108 may make a determination of whether the problems observed are indicative of problematic paths, or the problems are more indicative of problematic nodes.

Additionally, information associated with a first rack of nodes may be used to extrapolate information associated with one or more other racks of nodes having a path which crosses at least one of the nodes in the first rack. For example, once a determination is made that a path associated with a node is problematic, any racks having a node on the problematic path may be identified as impacted by the network failure.

Then, at block 504 the impact determination routine determines the appropriate set of information to analyze. For example, the network failure impact determination system may determine that some of the collected information may need to be removed from the set, and it may also determine information regarding other racks even if the information is not necessarily collected from the other racks by extrapolating. Continuing the example above, the collected information across node 1 may be removed from the set, due to an indication of a problematic node as opposed to problematic paths. Node 1 may thus be considered to be an outlier, because that node's number of problematic paths is relatively very high. Once a node is considered to be an outlier, all the links passing through that node may be removed from the set of information processed to determine the impact of network failures. Therefore, in the example above, all of the links passing through node 1 are removed from the set of collected information used to detect network failures and to also determine the impact of those network failures. Similarly, if a path is determined to be problematic, any racks having a node on the problematic path may be identified as impacted by the network failure, even if information is not collected for that node.

At block 506, having removed the outliers from the set of collected information, and also having extrapolated information to other racks as appropriate, the impact determination component 108 may determine the impact of any network failures. For example, the impact determination component 108 may determine the set of problematic paths in the network after discounting for problematic nodes. Once the correct set of problematic paths is determined, the component 108 may make a determination of the reachability of various nodes and/or racks in the network. The various nodes and/or racks in the network may be associated with various customers of the data center. Therefore, an indication of the reachability of the various nodes/racks provides an indication of the potential impact to the service of the respective customers. Once the impact of network failures is determined, the routine 500 ends at block 508.

Though the process described above may describe actions or events in a linear manner, the description is not meant to imply that linear execution of the process is required. One skilled in the art will appreciate that components of the process described above may be carried out in different orders than described above. As such, the description of the process above is intended to be descriptive of one example only.

It will be appreciated by those skilled in the art and others that all of the functions described in this disclosure may be embodied in software executed by one or more processors of the disclosed components and mobile communication devices. The software may be persistently stored in any type of non-volatile storage.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art. It will further be appreciated that the data and/or components described above may be stored on a computer-readable medium and loaded into memory of the computing device using a drive mechanism associated with a computer readable storing the computer executable components such as a CD-ROM, DVD-ROM, or network interface further, the component and/or data can be included in a single device or distributed in any manner. Accordingly, general purpose computing devices may be configured to implement the processes, algorithms and methodology of the present disclosure with the processing and/or execution of the various data and/or components described above.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A computer-implemented method for determining performance of network paths, the method comprising:

measuring a packet loss rate across individual ones of a plurality of network links in a network, wherein a network link includes at least two nodes;

creating a set of path performance information by aggregating the measured packet loss rates across the plurality of network links;

creating an adjusted set of path performance information by excluding the measured packet loss rates across a subset of the plurality of network links from the set of path performance information, wherein the subset is selected based at least in part on:

determining, for each of at least two paths of a plurality of paths in a logical grouping, a quantity of network links included in the path with a measured packet loss rate above or below a predetermined threshold; and determining that one or more of the at least two paths is associated with a measured packet loss rate that is statistically different from a measured packet loss rate of other paths in the same logical grouping, if a difference between two of the quantities of links exceeds a predetermined level; and determining a failure on one or more of a plurality of network paths based on the adjusted set of path performance information.

2. The computer-implemented method of claim 1, wherein excluding the measured packet loss rate across the subset of the plurality of network links comprises:

determining the logical grouping of a plurality of paths in the network;

processing the measured packet loss rate across the network links including at least two nodes in the same logical grouping; and determining, based on processing of the measured packet loss rate, that one or more of the at least two paths in the same logical grouping is associated with a measured packet loss rate that is statistically different from the measured packet loss rate of other paths in the same logical grouping.

3. The computer-implemented method of claim 2, wherein determining that one or more of the at least two paths in the same logical grouping is associated with a measured packet loss rate that is statistically different from the measured packet loss rate of other paths in the same logical grouping comprises:

determining a first quantity of network links included in a first of the two paths with a measured packet loss rate above the predetermined threshold;

determining a second quantity of network links included in the first of the two paths with a measured packet loss rate below the predetermined threshold;

determining a third quantity of network links included in a second of the two paths with a measured packet loss rate above the predetermined threshold;

determining a fourth quantity of network links included in the second of the two paths with a measured packet loss rate below the predetermined threshold;

determining a first difference between the first and third quantities;

determining a second difference between the second and fourth quantities; and determining that one or more of the at least two paths is associated with a measured packet loss rate that is statistically different from the measured packet loss rate of other paths in the same logical grouping if one or more of the first and second differences exceeds the predetermined level.

4. The computer-implemented method of claim 3, wherein the measured packet loss rate is statistically different if the measured packet loss rate is numerically distant from the respective measured packet loss rate of a plurality of other paths in the same logical grouping, and the respective measured packet loss rates of the plurality of other paths in the same logical grouping are numerically close to one another.

5. The computer-implemented method of claim 1, wherein creating the adjusted set of path performance information further comprises extrapolating packet loss rates for a subset of network paths, comprising:

determining a logical grouping of a plurality of paths in the network;

processing the measured packet loss rate across the network links included in at least two paths in the same logical grouping;

creating a set of path performance information by aggregating the measured packet loss rates across the network links;

determining the subset of network paths in the network including one of the at least two paths; and establishing that the path performance for the subset of network paths in the network including one of the at least two paths is the same as the path performance created based on the aggregated measured packet loss rates across the network links.

6. The computer-implemented method of claim 1 further comprising alerting the one or more customers about the determined impact.

7. A system for detecting impact of network failures, the system comprising:

a network failure impact determination component comprising one or more computing devices configured to execute specific instructions, the network failure impact determination component operable to:

collect a set of communication attributes across each of a plurality of network links in a network, wherein the network comprises a plurality of nodes and a plurality of links, wherein a link connects two nodes;

create an adjusted set of communication attributes by excluding, from the set of communication attributes, the collected communication attributes across a subset of the plurality of links associated with at least one node, wherein the subset is selected based at least in part on:

determining, for each of at least two paths of a plurality of paths in a logical grouping, a quantity of links included in the path that are associated with a collected communication attribute associated with a value above or below a predetermined threshold; and determining that one or more of the at least two paths is associated with a collected communication attribute that is statistically different from a collected communication attribute of other paths in the same logical grouping, if a difference between two of the quantities of links exceeds a predetermined level; and determine a failure on one or more of a plurality of network paths based on the adjusted set of communication attributes.

8. The system of claim 7, wherein the network failure impact determination component is further operable to determine nodes associated with respective customers.

9. The system of claim 8, wherein the network failure impact determination component is further operable to determine paths including nodes associated with respective customers.

10. The system of claim 9, wherein the network failure impact determination component is operable to determine impact to one or more customers of the determined failure by calculating a percentage of paths associated with respective customers determined to comprise a failure.

11. The system of claim 7 further comprising a physical computer data storage configured to store at least one of the collected communication attributes, the at least one node associated with a collected communication attribute that is statistically different or the determined performance of the network, the determined failure or the determined impact.

12. The system of claim 7 further comprising an interface configured to make available for display the determined impact to one or more customers.

13. The system of claim 7 wherein the network failure impact determination component is further operable to alert the one or more customers about the determined impact.

14. Non-transitory physical computer-readable storage having a computer-executable component, the computer-executable component comprising:
- a network failure impact determination component configured to:
- collect a set of communication attribute across individual ones of a plurality of network paths in a network, wherein the network includes a plurality of nodes located in a plurality of locations, and wherein a network path includes at least two nodes and at least one link;
- create a set of network performance information by aggregating the measured communication attributes across the plurality of network paths;
- process the set of network performance information to:
  - determine, for each of at least two nodes of a plurality of nodes at the same location, a quantity of paths passing through the node that are associated with a collected communication attribute associated with a value above or below a predetermined threshold; and
  - determine that one or more of the at least two nodes is associated with a collected communication attribute that is statistically different from the collected communication attributes of other nodes at the same location, if a difference between two of the quantities of paths exceeds a predetermined level;
- create an adjusted set of network performance information by excluding the collected communication attributes of links associated with the one or more nodes determined to be associated with a collected communication attribute that is statistically different from the collected communication attributes of other nodes at a same location; and
- determine a degradation on one or more of the plurality of network paths in the network based on the adjusted set of network performance information.

15. The non-transitory physical computer-readable storage of claim 14, wherein the network failure impact determination component is further configured to exclude the collected communication attributes of the links associated with the one or more nodes determined to be associated with a collected communication attribute that is statistically different from the collected communication attributes of the other nodes at the same location from the set of network performance information by re-collecting the communication attribute across the path without the links.

16. The non-transitory physical computer-readable storage of claim 14, wherein the communication attribute is at least one of a packet transfer rate, a loss, or a packet loss rate.

17. The non-transitory physical computer-readable storage of claim 14, wherein the communication attribute is at least one of jitter and latency.

18. The non-transitory physical computer-readable storage of claim 14, wherein the network failure impact determination component is configured to determine the degradation of the plurality of network paths by determining network paths with a communication attribute below a predetermined threshold.

19. The non-transitory physical computer-readable storage of claim 18, wherein the predetermined threshold comprises a percentage.

20. The non-transitory physical computer-readable storage of claim 14, wherein the network failure impact determination component is configured to determine impact to one or more customers of the determined degradation on the one or more of the plurality of network paths by:
- determining nodes associated with respective customers;
- determining paths including nodes associated with respective customers; and
- determining impact to one or more customers of the determined degradation by calculating a percentage of paths associated with respective customers determined to comprise a degradation.

\* \* \* \* \*